Sept. 3, 1929.   A. F. WARD ET AL   1,726,938

PROCESS AND APPARATUS FOR SEPARATING PLASTICS

Filed Feb. 27, 1926

Inventors,
Ashley F. Ward,
Paul S. Ward,

By Murray and Gugeeter
Attorneys.

Patented Sept. 3, 1929.

1,726,938

UNITED STATES PATENT OFFICE.

ASHLEY F. WARD AND PAUL S. WARD, OF CINCINNATI, OHIO, ASSIGNORS TO ASHLEY F. WARD, INC., OF CINCINNATI, OHIO, A CORPORATION OF OHIO.

PROCESS AND APPARATUS FOR SEPARATING PLASTICS.

Application filed February 27, 1926. Serial No. 91,273.

Our invention relates to a process for dividing a given mass into a plurality of smaller masses and for then successively separating the smaller masses one from the other.

An object of our invention is to facilitate the separation of smaller masses of plastic, for example, dough, preparatory to subjection of the individual masses of dough to various working operations.

Another object of our invention is to provide a means and method whereby a single operator may accomplish that which heretofore has required the services of a plurality of skilled workmen or bakers.

These and other objects are attained by means and method described herein and disclosed in the accompanying drawings in which Fig. 1 is a diagrammatic view of apparatus used in following my process.

Figure 1:
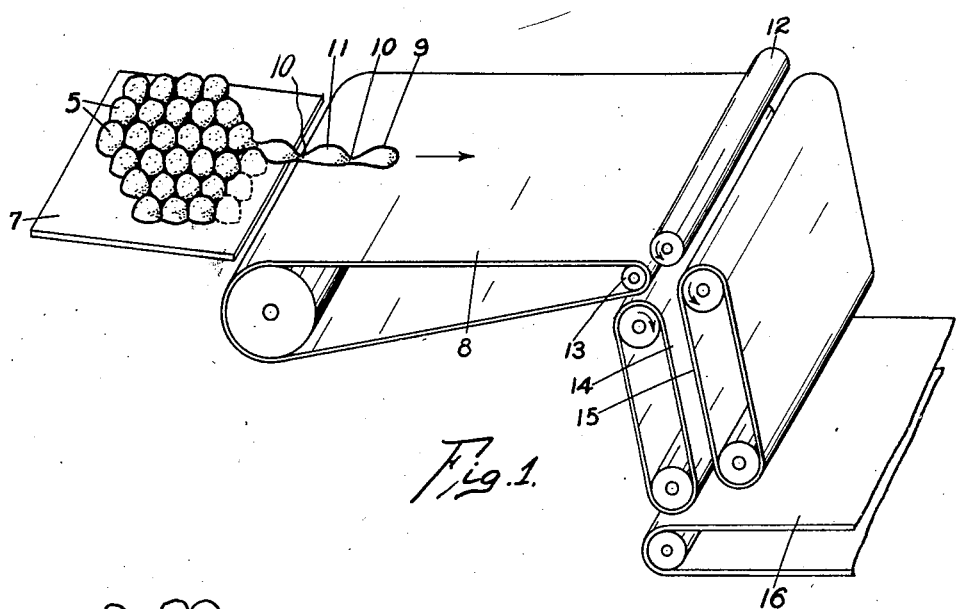
Figure 2:
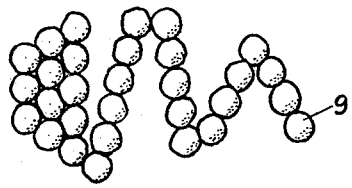
Fig. 2 is a diagrammatic view showing the sequence or connection of a plurality of small masses of dough that have been separated one from the other, except for a connection of practically each of said masses with two adjacent small masses.
Figure 3:
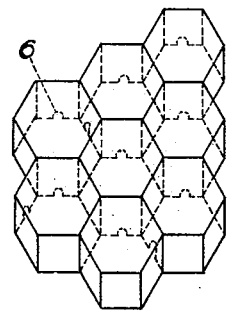
Fig. 3 is a fragmental diagrammatic perspective view of a portion of a die used for producing the individual masses disclosed in Fig. 2.

In carrying out our process, a large mass of dough is played in a suitable receptacle, for example, as shown in Fig. 1 of Ward Patent No. 1,144,953, of June 29, 1915. This mass of dough is sub-divided into a plurality of individual smaller masses or units 5, each corresponding with the sub-divided masses 5 in said patent, except that in carrying out the process disclosed herein, the smaller masses 5 each have a connection, with the exception of the first and last of said small masses, with two adjacent small masses, for example, as shown in Fig. 2. This connection is effected by so arranging the dies, for example, as shown in my said patent, whereby a small section or restricted connecting neck of dough preferably adjacent the bottoms of the small individual masses 5, remains unsevered and connects adjacent small masses. By reference to Fig. 3, it will be observed that the dies are provided with small notches 6, for accomplishing the said purpose. After a pan or receptacle of dough has been sub-divided, for example, as shown in Fig. 2 of my said patent, the attendant deposits the several small masses, hereafter referred to as biscuit masses, upon a suitable table 7. This may be accomplished by inverting the receptacle over the table 7. Adjacent the table 7 there is provided a conveyor 8. The movement of the conveyor 8 and the adhesion of the biscuit mass 9 thereto, together with the connection 10 between the biscuit mass 9 and the biscuit mass 11, serves to draw the biscuit masses, one after the other, or in tandem, from the table 7 upon and with the conveyor 8, and at the same time stretch the connecting necks 10 so as to draw the biscuit masses apart into a more widely spaced relation. The connections or necks 10 between adjacent biscuit masses result because of the failure of the notched portions of the dies to completely sever adjacent biscuit masses. At the right hand end of the conveyor shown in Fig. 1, there is provided a retarding roll 12. The biscuit masses pass between the retarding roll 12 and the right hand end of the conveyor 8 that is supported by a suitable roll 13, and are then fed to a pair of rapidly moving endless conveyors 14 and 15 that serve to grasp an individual biscuit mass from the roll 12 and the conveyor 8, and to quickly carry the biscuit mass away, thereby severing the connection 10 between succeeding biscuit masses. From the conveyors 14 and 15 the individual biscuit masses may be carried to any suitable mechanism for operating upon the individual biscuit masses preparatory to proofing of the individual biscuit masses. There is shown herein a fragment of a conveyor 16 for receiving the individual biscuit masses from the conveyors 14 and 15. It is to be understood that the conveyor 16 may carry the biscuit masses to any suitable place and that the conveyor 16 may be dispensed with and that conveyors 14 and 15 may discharge directly into a suitable baller or the like for operating upon the plastic masses.

In practice a thin ribbon or strip of dough may extend between adjacent small masses of dough after the initial sub-dividing step. It is not necessary that the small masses be absolutely and entirely severed from all other such masses, but that the stronger connection between certain adjacent masses be sufficient to withstand the breaking down of the ribbons or strips of dough and so effect a single file arrangement, as previously explained.

In practicing our invention, the dies used for severing the large mass of dough into biscuit masses, may be lubricated or oiled with suitable edible oils whereby to preclude adhesion of the severed biscuit masses. It is to be understood that the mass of dough to be divided may be raw dough or proofed dough.

After the mass of dough is cut and deposited on the table 7, as shown in Figure 1 of the drawings, the dough exists in the form of a chain consisting of individual biscuits connected by the connections or necks left by the notches 6. This chain of biscuits lies in a nested formation, the convolutions of the chain lying against each other.

As this chain is drawn out on the conveyor, as shown in Figure 1, it is straightened so that the biscuits assume a straight single file formation. The necks connecting the adjacent biscuits serve to draw them from the nest into the single file formation. As this chain is drawn out on the conveyor 8, the individual biscuits are separated by stretching the necks or connections 10 between the individual biscuits, so that the chain assumes an elongated condition in which the individual biscuits are spaced apart but are still connected by the stretched necks. Later these stretched necks are severed, preferably being pulled apart by the faster traveling belts 14 and 15.

The present invention is particularly applicable to the making of individual biscuits from a mass of biscuit dough. The term "biscuits" is intended to include what are sometimes known as "rolls" in the baking trade. Biscuit dough is what is known as a soft dough, as described, for instance, in my prior Patent 1,144,953, above referred to. A soft dough is raised with yeast. It is tacky and tenacious. In attempts to handle individually connected biscuits considerable difficulty has been encountered due to the tendency of the individual biscuits to adhere and stick together, and also because of their tendency to stick to various surfaces of handling machinery. As described above, the dies which sub-divide the mass are oiled to preclude adhesion between the severed edges of the individual biscuit masses except for the necks which are left by the notches in the cutting blades, so that the individual biscuits may be separated and drawn out into chain connected by the reduced neck portions. On account of the stretchable tenacious quality of the soft biscuit dough, these necks form fairly strong connections between the individual biscuits and allow the chain to be drawn out onto the conveyor.

These necks may be stretched considerably without rupture, which permits the biscuit to be drawn apart or separated while still connected by the reduced stretched necks, as shown in Figure 1 of the drawings. The necks are thereafter severed by pulling them apart or otherwise, in order to obtain the completely severed or separated biscuit.

It is further evident that the small masses comprising the rank, for example, the small masses of dough extending transversely in the nest of small masses shown in Fig. 1, may be severed from one another and that the file of such nested small masses may be connected by a portion such as 10, wherefore, the small masses may be advanced by the conveyor 8 in ranks and files, the retarding roll 12 serving to retard one rank of small masses while the belts 14 and 15 are detaching the preceding rank of small masses as previously explained with a single file of small masses.

From the foregoing, it is readily evident that our process and apparatus is especially adaptable to expeditious handling of a plurality of small masses of dough that previously required individual handling.

What we claim is:

1. The process of dividing a given mass of dough which consists in sub-dividing a mass of dough into a plurality of biscuit masses, leaving a connection between each biscuit mass and two adjacent biscuit masses, except the first and last biscuit masses, each of which has a single connection with adjacent biscuit masses, said connection being such that will withstand a slow, steady, pulling action without severing such connected biscuit masses and incapable of withstanding action tending to rapidly separate such connected biscuit masses, slowly moving one of said biscuit masses from proximity to the severed biscuit masses whereby the biscuit masses are developed into a file, each biscuit mass serving to pull succeeding masses with it and then successively applying a rapid conveying motion to the individual biscuit masses for breaking the connection between successive biscuit masses.

2. Apparatus of the class described comprising means for severing a mass of dough into a plurality of biscuit masses, each biscuit mass connected with at least one, but not more than two, adjacent biscuit masses, a table for receiving the biscuit masses when so severed, an endless belt adjacent the table and for moving the biscuit masses into a file after one of said biscuit masses has been moved from the table to the conveyor, a retarding roll, a pair of endless conveyors for receiving individual biscuit masses from the first conveyor and the retarding roll, the said pair of endless conveyors moving faster than the first mentioned conveyor, and the retarding roll co-operating with the first mentioned conveyor in holding one biscuit mass while the preceding biscuit mass is received by the faster moving pair of conveyors for severing the connection between the adjacent biscuit masses.

3. Apparatus of the class described comprising means for dividing a given mass into a nest of connected individual small masses, means for moving the small masses in tandem, a retarding means for co-operation with the moving means for controlling movement of the masses, and means for receiving the masses from the moving means and severing the connection from the succeeding masses still under the control of the retarding means.

4. The process of dividing a mass of biscuit dough into biscuits, which comprises forming the dough into a chain consisting of individual biscuits connected by necks, pulling out the chain and stretching the necks to draw the biscuits apart, and thereafter severing the necks.

5. The process of dividing a mass of biscuit dough into biscuits, which comprises cutting the mass of dough so as to form a nested chain consisting of individual biscuits connected by necks, pulling out the forward end of the chain so as to straighten it into a file formation, the connecting necks serving to draw the biscuits from the nested mass and stretching under the pull so as to permit the biscuits to be drawn apart, and thereafter severing the necks to completely separate the biscuits.

6. The process of dividing a mass of biscuit dough into biscuits, which comprises cutting the mass of dough so as to form a nested chain consisting of individual biscuits connected by necks, pulling out the forward end of the chain so as to straighten it into a file formation, the connecting necks serving to draw the biscuits from the nested mass, and thereafter severing the necks to completely separate the biscuits.

7. The process of dividing a mass of biscuit dough into biscuits, which comprises cutting the mass of dough to form a nested chain consisting of individual biscuits connected by necks, pulling out the chain into a file formation, and severing the necks between the biscuits.

8. The process of dividing a mass of tenacious plastic material, which comprises subdividing the mass so as to form a series of individual units connected by restricted necks and lying in a nest formation, drawing out the thus connected units into file formation, and thereafter severing the connecting necks.

9. Apparatus for dividing a mass of tenacious plastic material into a plurality of smaller masses, comprising means for partially severing the mass so as to leave the units in a nested chain-like formation with the individual units connected by necks so as to permit them to be drawn from their nested arrangement into a file by means of the connecting necks, means for drawing out the chain-like formation of units into a file, and means for thereafter completely separating the units.

In testimony whereof, we have hereunto subscribed our names this 26th day of February, 1926.

ASHLEY F. WARD.
PAUL S. WARD.